(12) United States Patent
Salvador

(10) Patent No.: US 7,859,543 B2
(45) Date of Patent: Dec. 28, 2010

(54) DISPLAYING IMAGES

(75) Inventor: Richard H. Salvador, Hawthorne, CA (US)

(73) Assignee: Apple Inc., Cupertino, CA (US)

( * ) Notice: Subject to any disclaimer, the term of this patent is extended or adjusted under 35 U.S.C. 154(b) by 929 days.

(21) Appl. No.: 11/478,761

(22) Filed: Jun. 29, 2006

(65) Prior Publication Data
US 2008/0005771 A1    Jan. 3, 2008

(51) Int. Cl.
G09G 5/00    (2006.01)

(52) U.S. Cl. .................. 345/581; 715/765; 382/100

(58) Field of Classification Search .......... 395/326, 395/606, 348; 382/100, 181, 189, 190, 195, 382/209, 220, 224, 227, 282, 305, 112–113, 382/128, 130–132, 141, 254–255, 307, 309, 382/311, 232; 715/205, 723, 762, 764, 765, 715/766, 767, 768, 769, 770, 771, 772, 773, 715/774, 775, 776, 777, 778, 779, 780, 781, 715/782, 783, 784; 725/105; 707/3, 6; 345/156, 345/30; 354/410
See application file for complete search history.

(56) References Cited

U.S. PATENT DOCUMENTS

| | | | | |
|---|---|---|---|---|
| 6,097,389 | A * | 8/2000 | Morris et al. | 715/804 |
| 6,311,180 | B1 * | 10/2001 | Fogarty | 707/4 |
| 6,362,900 | B1 * | 3/2002 | Squilla et al. | 358/442 |
| 6,476,858 | B1 * | 11/2002 | Ramirez Diaz et al. | 348/159 |
| 6,750,888 | B1 * | 6/2004 | Nakagawa | 715/800 |
| 6,813,395 | B1 * | 11/2004 | Kinjo | 382/305 |
| 7,095,907 | B1 * | 8/2006 | Berkner et al. | 382/298 |
| 7,400,761 | B2 * | 7/2008 | Ma et al. | 382/162 |
| 2002/0032696 | A1 * | 3/2002 | Takiguchi et al. | 707/500.1 |
| 2002/0069218 | A1 * | 6/2002 | Sull et al. | 707/501.1 |
| 2003/0095197 | A1 * | 5/2003 | Wheeler et al. | 348/241 |
| 2003/0154190 | A1 * | 8/2003 | Misawa et al. | 707/1 |
| 2005/0125454 | A1 * | 6/2005 | Hung | 707/104.1 |
| 2006/0129933 | A1 * | 6/2006 | Land et al. | 715/723 |
| 2006/0146075 | A1 * | 7/2006 | Weiss et al. | 345/660 |
| 2008/0007788 | A1 * | 1/2008 | Good et al. | 358/302 |

OTHER PUBLICATIONS

JEITA CP-3451, "Exchangeable image file format for digital still cameras: Exif Version 2.2", Standard of Japan Electronics and Information Technology Industries Association, Apr. 2002.*
Flickr, "Popular Tags on Flickr Photo Sharing" printed Sep. 27, 2006, http://www.flickr.com/photos/tags, pp. 1-2.
Apple Computer, Inc. Technical Manual, "Aperture Getting Started" 2006, http://manuals.info.apple.com/en/Aperture_Getting_Started.pdf#search=%22%22Introducing%20Aperture%20%22%20%2B%22Learning%20About%20the%20Aperture%20Interface%22%22, pp. 1-222.

* cited by examiner

Primary Examiner—Andrew W Johns
Assistant Examiner—Tahmina Ansari
(74) Attorney, Agent, or Firm—Hickman Palermo Truong & Becker LLP

(57) ABSTRACT

Displaying an image is described. A method for displaying an image includes determining, for each of multiple images, metric associated with the image. The multiple images are displayed in a view in which each of the multiple images is associated with at least one visually perceivable attribute that reflects at least the determined metric. The attributes that reflect the metrics are logically independent of the metrics. In one implementation, the metric relates to a significance value associated with the image. In one implementation, the visually perceivable attribute relates to a size with which the multiple images are displayed in relation to each other.

52 Claims, 12 Drawing Sheets

DISPLAYING IMAGES

FIELD OF THE INVENTION

The present invention relates to visually presented information. More particularly, embodiments of the present invention relate to methods for displaying an image.

BACKGROUND

Information exists in many forms, some of which are visible. Visible information exists in a form that is visually perceivable by sighted humans. Visible information includes images. Graphical images are those that are rendered in some format that is typically characterized by some degree of persistence or durability. Drawings, for instance, are images that are typically recorded for viewing on a medium such as paper. Photographs are images captured with a camera or a similar device.

Cameras are apparatus that record photographic images in some medium. Legacy cameras record photographs with a chemical medium, typically silver based preparations suspended in gelatinous film emulsions. The silver particles therein oxidize to varying degrees based upon their exposure to light by the camera and change their visually perceivable hue and brightness to record the image as a film based photograph. More modernly, digital cameras capture images electronically.

Digital cameras typically capture images with light sensitive charged coupled devices (CCDs). They record photographs with processing of signals from the CCDs into data. These data are typically stored in flash memory as a digitally rendered record of the image. Such digital photographs enjoy many advantages. Digital photographs may be transferred from the camera with which they were captured to other electronic media including those with information processing capability such as a computer.

Modern computers have capabilities that allow them to easily, efficiently and economically store, handle and process digital photographs and other graphical images with great effect. The capabilities of computers and digital cameras provide powerful tools to photographers and graphic artists, professional and amateur alike. In fact, computers allow digital photographs to be printed and legacy photographs to be scanned, thus allowing photographs to transcend media limitations and change format.

Digital photographs may be viewed on a computer display. The visual depiction of a digital photograph on a display is referred to herein as the display-image of the photograph. Frequently, the display-image of the photograph has a lower resolution than the photograph itself. Relatively low-resolution display-images of photographs are often referred to as thumbnails.

The display-images of multiple digital photographs may be simultaneous displayed on a computer monitor. The simultaneous display of multiple display-images can be useful for a variety of photographic processing tasks, such as editing. The editing function itself can include other functions that are amenable to displaying multiple photographs together. Two such editing functions include sorting and grouping.

In presenting multiple photographs for display together on the same monitor, there are a variety of ways in which the display-images of the photographs can be visually arranged. For instance, the display-images may be arranged manually, e.g., as desired by the user. Alternatively, the display-images may be automatically arranged in a grid-like arrangement.

The display-images of all of the photographs in a particular collection may be displayed together on the monitor, if the collection is small enough and the monitor is large enough. In this context, "small enough" means that the cumulative resolution of the display-images of the photographs in the collection does not exceed the resolution of the display screen.

Image management applications have been developed for digital image management on computers. Such applications provide convenient and powerful image processing, storage, and production capabilities. Image management applications can utilize the great power, speed and capacity that are available with the processing, memory, and storage components on modern computer platforms, as well as the high display qualities of graphics hardware, software, interfaces and monitors.

Modern image management applications allow computers to process "information content" associated with photographs and other images. The information content associated with a digital image may include metadata about the image, as well as data that describes the pixels of which the image is formed. The metadata can include, for example, text and keywords for an image's caption, version enumeration, file names, file sizes, image sizes (e.g., as normally rendered upon display), resolution and opacity at various sizes and other information.

Image keywords, Exchangeable Image File (EXIF) and International Press Telecommunications Council (IPTC) may also be associated with an image and incorporated into its metadata. EXIF metadata is typically embedded into an image file with the digital camera that captured the particular image. These EXIF metadata relate to image capture and similar information that can pertain to the visual appearance of an image when it is presented.

EXIF metadata typically relate to camera settings that were in effect when the picture was taken (e.g., when the image was captured). Such camera settings include, for example, shutter speed, aperture, focal length, exposure, light metering pattern (e.g., center, side, etc.) flash setting information (e.g., duration, brightness, directedness, etc.), and the date and time that the camera recorded the photograph. Embedded IPTC data can include a caption for the image and a place and date that the photograph was taken, as well as copyright information.

The user of an image management application can use the image management application to add other information to an image's content. For instance, a user-specified rating, or other metric, may be stored as part of the metadata for an image. Such ratings and metrics can relate to information of particular value to the user. The ratings and metrics may add objective information to the metadata associated with a photograph, such as data that reflects a category to which the image is assigned within a collection of images, a source of the image (such as a particular photographer or artist), a project or purpose to which the image relates, and a value, intrinsic or extrinsic, that the image possesses.

Such ratings and metrics however may also convey more subjective user-assigned information, such as a quality level that the user ascribes to a photograph, or a level of artistic or aesthetic merit ascribed thereto. Similarly, the ratings and metrics can simply convey a level of favor, satisfaction and personal liking with which the user holds a particular image. Further, their metadata, including such ratings and metrics, whether objectively or subjectively ascribed or both can allow multiple stored photographs to be compared relative to each other.

When multiple photographs are displayed together, they may be arranged on the monitor screen by the user in accordance with their relationships and comparisons. For example, users may decide to place their favorite photographs along the top of a group of photographs, or down a particular side of the monitor screen, or in some other position that, to a particular user, conveys the subjective and/or objective criteria with which that user decided to have them displayed.

Such arrangements can provide usefulness in the display of multiple photographs, such as directing attentiveness to certain images and/or away from others, conveying a graphical emphasis, and promoting organization. This utility can increase the effectiveness and efficiency of editing and other tasks and functions.

However, the procedures and criteria used to display photographs and other images are typically selected on an ad hoc basis, which can sometimes be inefficient. Further, the ad hoc basis with which photographs are conventionally displayed can require significant forethought and planning by the user to implement. To implement the arrangement once it is planned, the user may also have to execute significant manual programming or operating tasks, which can be time consuming, distracting and tedious and may introduce more inefficiency.

Moreover, for each group of multiple photographs that a user may want to display together, these ad hoc arrangement procedures must be applied anew. However, where different groups of multiple photographs are to be arranged or where certain photographs are included in various groups, the ad hoc procedures must be repeated, yet the criteria with which the images are rated may not hold between the various groupings. This can add a confusion factor to the display arrangement procedure that can cause even greater inefficiency, as it requires additional thought, planning, control and adjustment to implement.

FIG. 4 depicts a typical image storage and display technique 400 familiar in the conventional art. Images 405 and 415 are stored electronically within storage unit 491, which can comprise memory, drives, servers, a storage area network (SAN) or any other medium, apparatus or network capable of image storage. While only two images are shown for simplicity and brevity, as well as to avoid confusion, the number of images storable is limited only by the storage capacity of storage unit 491.

Stored with images 405 and 415 are metadata 403 and 413, which are respectively associated each therewith. These metadata respectively include metric values 401 and 411. Metric value 401 is associated with image 405 and metric value 411 is associated with image 415 according to the associations 406. Images 405 and 415 are retrieved (e.g., accessed in storage 491, processed, etc.) and transmitted via image retrieval path 476 for display with display 450. Image retrieval path 476 can include one or more buses, wire line and/or wireless transmission media. Display 450 can comprise a computer monitor or other display vehicle and image processing means such as a graphics card. Display 450 displays display-images 406 and 416 as graphical representations of the images 405 and 415, respectively.

The metric values 401 and 411, which respectively relate to images 405 and 415, may vary. Upon image retrieval via image path 476, display-images 406 and 416 are displayed conventionally by display 450. However, the display-images 406 and 416 as thus conventionally displayed proffer no way to tell, by looking at these display-images of the images 405 and 415, that they are associated with very different metrics. As conventionally displayed, notwithstanding any difference in their respective metric values 401 and 411, the display-images 406 and 416, are displayed with visually perceivable attributes that are virtually indistinguishable from each other. In order to visually distinguish the display-images 406 and 416, a user viewing conventional display 450 must resort to comparison of the content of the images or similar conventional techniques.

In as much as visually distinguishing the display-images 406 and 416 may be a significant function in editing and other applications, a user is forced to conventionally arrange display-images 406 and 416 on display 450 according to some basis. That basis may be taking metrics 401 and 411 into some account. However, the basis is conventionally an ad hoc one made for each grouping of images, such as images 405 and 415. And for other images, the user is forced to repeat the process. This can be tedious, time consuming and inefficient.

The approaches described in this section are approaches that could be pursued, but not necessarily approaches that have been previously conceived or pursued. Therefore, unless otherwise indicated, it is not to be assumed that any of the approaches described in this section qualify as prior art, merely by virtue of their inclusion in this section.

SUMMARY

A method for displaying an image is disclosed. One method comprises determining, for each of multiple images, at least one metric associated with the image. The multiple images are displayed in a view in which each of the multiple images is associated with at least one visually perceivable attribute that reflects at least the determined metric. The attributes that reflect the metrics are logically independent of the metrics. In one embodiment, the metric relates to a significance value associated with the image. In one embodiment, the visually perceivable attribute relates to a size with which the multiple images are displayed in relation to each other.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The embodiments of the present invention described herein relate to a method for displaying an image. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described hereafter for displaying multiple digital images on a display, where the display-image of each digital image reflects some metric associated with the image. According to one embodiment, the digital images are displayed in a manner in which the display-image of each of the multiple images has at least one visually perceivable attribute that (1) reflects a metric, but that is (2) logically independent of the metric.

For example, the metric may be "significance values" associated with the images, and the visually perceivable attribute may be the size of the display-images of the images. Thus, in this example, the display-images of images that have higher significance values may be bigger than the display-images of images that have lower significance values.

Using the techniques described herein, the ad hoc procedures and criteria that are conventionally used to display photographs and other images are obviated. Further, the significant forethought and planning needed to implement conventional arrangements are also obviated, along with the possibly significant manual programming or operating tasks. Thus, the embodiments described herein can save time and avoid the distractions and tedium that can characterize conventional display techniques and may thus increase efficiency. Moreover, the advantages enabled with the present embodiments apply even where multiple images are grouped in various groupings. This has the additional benefit of reducing the possibility of confusion and loss of efficiency.

Exemplary Methods for Displaying an Image

Figure 1:
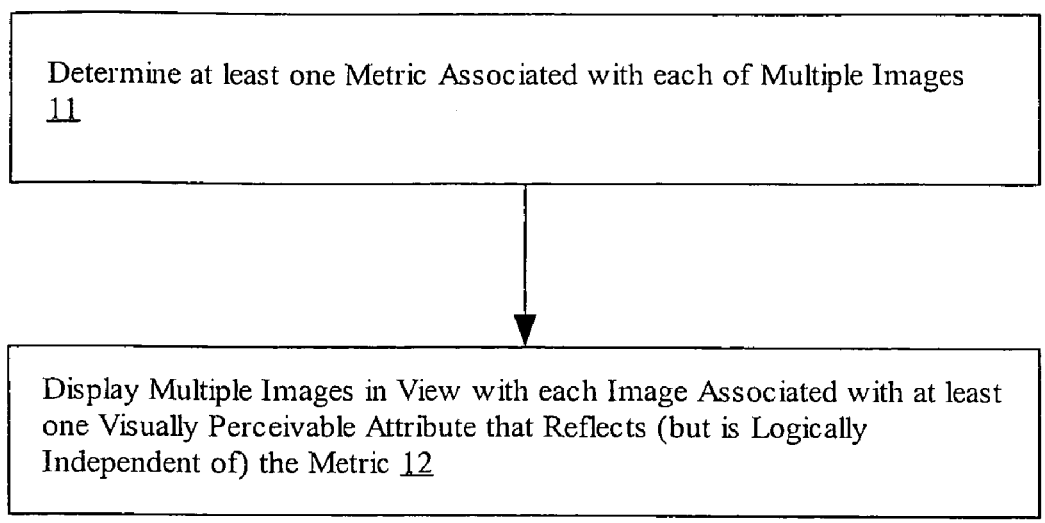
FIG. 1 depicts a flowchart for an exemplary method for displaying an image, according to an embodiment of the present invention.

FIG. 1 depicts a flowchart 10 for an exemplary method for displaying an image, according to an embodiment of the present invention. Method 10 begins with a block 11, wherein at least one metric associated with each image of multiple images is determined. The metric corresponds, in one embodiment, with a significance rating associated with each of the multiple images.

In block 12, the display-image of each of the multiple images is displayed in a view. The display-image of each image has at least one visually perceivable (e.g., discernable) attribute that reflects the metric, but that is logically independent thereof. In one embodiment, the visually perceivable attribute of each image comprises a displayed characteristic of that image that allows that image to be visually distinguishable from each of the other multiple images.

In one embodiment, the visually perceivable attribute is the size of the display-image of the image. For instance, the display size reflects a metric that corresponds to a significance of that image relative to each of the other multiple images. Thus, by looking at the size of the display-images, a user may easily tell the how "significant" the underlying images are relative to each other.

In one embodiment, where the significance metric of one image comprises a high value relative to the other images (e.g., the image has higher significance, relative to the other images), the size with which that image is displayed, relative to the others, is greater as well. Correspondingly, where the significance metric of one image comprises a low value relative to the other images (e.g., the image has lower significance, relative to the other images), the size with which that image is displayed, relative to the others, is smaller as well.

While the visually perceivable attribute reflects a metric that is logically independent of the attribute, the attribute may also reflect logically-related attributes. Thus, in the example given above, where the visually perceivable attribute is the size of the display-image of an image, the size of the display-image may also reflect any of a variety of other metrics with which an image may be associated.

For example, the "default" size of a display-image may initially be based on the inherent size (i.e. resolution) of the image. The actual size of the display image may result from adjusting that default size up or down based on the significance value associated with the image.

Thus, while the inherent "size" associated with an image may set the default size of its display-image, the significance attribute is still reflected in the adjustments made to the display-image size based on the significance value of the image. After the significance-based adjustments, an inherently smaller image may actually have a display-image that is larger than the display-image of an inherently larger image.

Metrics

In the example given above, the metric that is reflected by the size of the display-image is a significance value assigned to the corresponding image. However, significance value is merely one example of a metric that may be visually reflected in a visual attribute that is not logically related to the metric.

In one embodiment, any metric may be selected for reflection. The metric can comprise a default selection or one programmed by a user, an editor, an administrator, manager or the like.

In one embodiment, the metric comprises metadata stored in relation to the image. Those skilled in the relevant arts will realize that metadata tags may be electronically stored in association with a graphical image. The metric can comprise an objective rating of the image, such as a user assigned value that corresponds to a photographic quality associated with the image. The metric may also (or alternatively) comprise a subjective rating of the image, such as a user assigned value corresponding to aesthetic merit and/or a personal preference associated by the user with the image.

The metadata can comprise Exchangeable Image File (EXIF) data associated with the image and/or International Press Telecommunications Council (IPTC) data associated therewith. These data can comprise one or more of caption text and/or keywords that may be associated with the image, version enumeration values associated therewith, a file name and/or a file size that may be associated with the image.

The metric can also comprise data that relates to one or more camera settings with which the image was captured. Such data can include shutter speed, aperture opening, focal length, exposure, information relating to a flash used in exposing the image (e.g., brightness, duration and/or directionality), a metering pattern, a date and/or a time of exposure of the image.

The metric can also comprise embedded data, such as those which relate to an editing function. Such embedded data can comprise one or more of a caption, a place and/or a date at which the image was captured, an opacity or transparency value corresponding to said image as stored and copyright information associated with the image. The metric may also relate to a photographic identity, e.g., to a particular photographer, a photographic entity, or another source of the image.

Attributes

In the example given above, the attribute that reflects the significance metric is the size of the display-image of the image. However, the size of the display-image is merely one example of a visual attribute that may reflect a metric that is not logically related to the attribute. Any visually perceivable attributes that can be displayed may be selected. One may comprise a default; others may be programmed by a user, an editor, an administrator, manager or the like.

Thus, the visually perceivable attribute may be other than display size. For example, the visually perceivable attribute can be brightness. The display-images of images with higher significance values may be brightened, while the display-images of images with lower significance values may be darkened.

Embodiments of the present invention may be implemented with other visually perceivable attributes reflecting, yet logically independent of, the metrics associated with the images. For instance, in addition to or instead of the relative display size, metrics may be reflected in the relative degrees of brightness, clarity, contrast, tone, coloration, fuzziness, trim or border enhancements, transparency, opacity, shape, text based comments, and the like.

Flowcharts

Figure 2:
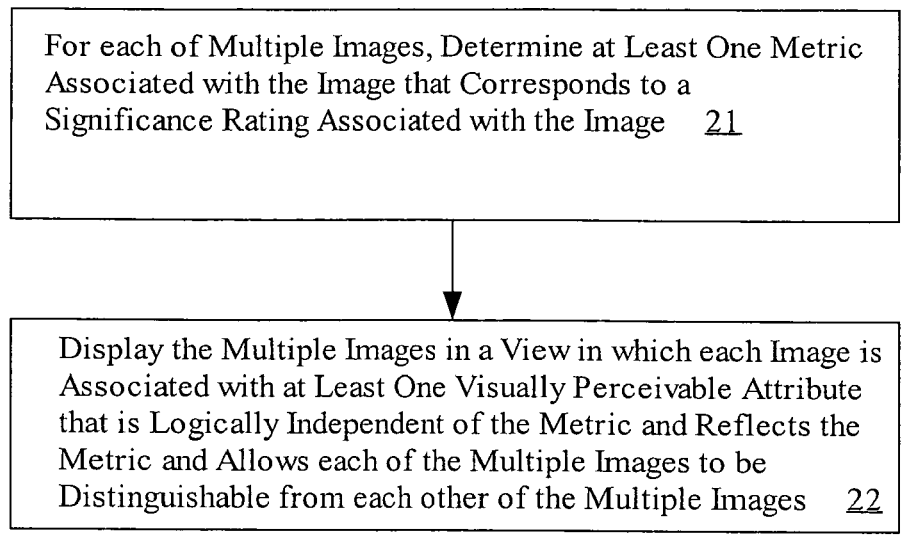
FIG. 2 depicts a flowchart for an exemplary method for displaying electronically stored images, according to an embodiment of the present invention.

FIG. 2 depicts a flowchart 20 for another exemplary method for displaying electronically stored images, according to an embodiment of the present invention. Method 20 begins with block 21 wherein, for each of multiple electronically stored images, at least one metric associated with the image is determined. The metric corresponds to a significance rating associated with the image.

In block 22, the multiple images are displayed in a view in which each image is associated with at least one visually perceivable attribute that, while logically independent thereof, reflects the metric and allows each of the multiple images to be distinguishable in the display from each of the other images.

Figure 3:
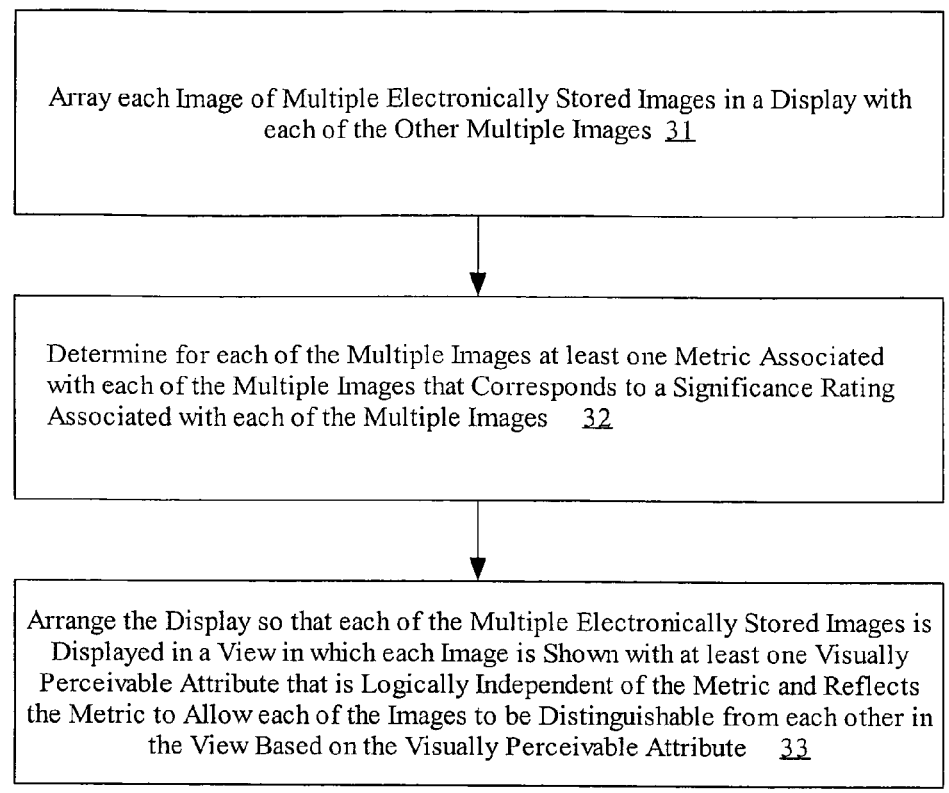
FIG. 3 depicts a flowchart for an exemplary method for displaying electronically stored images, according to an embodiment of the present invention.
Figure 4:
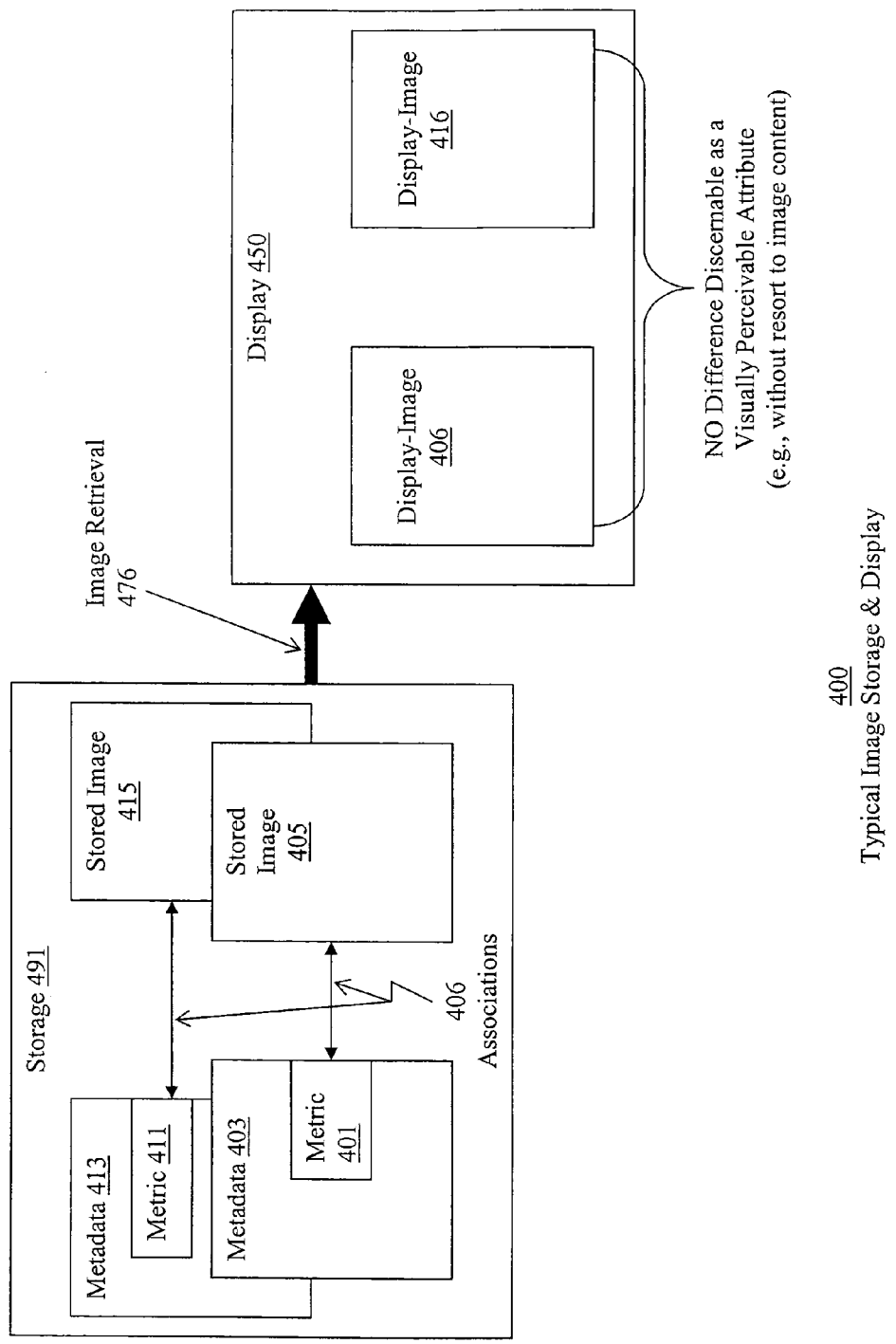
FIG. 4 depicts a typical image storage and display technique familiar in the conventional art.

FIG. 3 depicts a flowchart 30 for another exemplary method for displaying electronically stored images, according to an embodiment of the present invention. Method 30 begins with block 31, wherein each of multiple electronically stored images is arrayed in a display with the other images.

In block 32, for each of the multiple images, at least one metric associated therewith is determined. The one or more metrics correspond to a significance rating that is associated with each of the images.

In block 33, the display is arranged so that each of the multiple electronically stored images is displayed in a view in which each image is shown with at least one visually perceivable attribute that is logically independent of the metric and reflects the metric to allow each of the images to be distinguishable from each other in the view, based on the visually perceivable attribute.

In one embodiment, visually perceivable attribute comprises a display size of at least one of the images within the view. The display size reflects a significance value of each of the multiple images, relative to the others, and the other images are similarly displayed with their own display sizes, each of which reflects their own significance value. The significance value of the metric for the image is thus displayable relative to that of each of the other multiple images. Each of the other multiple images is likewise displayed with its own display size representative of a significance value its own metric.

In one embodiment, where the significance metric of one image comprises a high value relative to the other images (e.g., the image has higher significance, relative to the other images), the size with which that image is displayed, relative to the others, is greater as well. Correspondingly, where the significance metric of one image comprises a low value relative to the other images (e.g., the image has lower significance, relative to the other images), the size with which that image is displayed, relative to the others, is smaller as well. In one embodiment, methods 10, 20 and/or 30 are performed with computer systems wherein one or more processors thereof execute machine readable instructions that are encoded in a computer readable medium.

Exemplary Display

Figure 5:
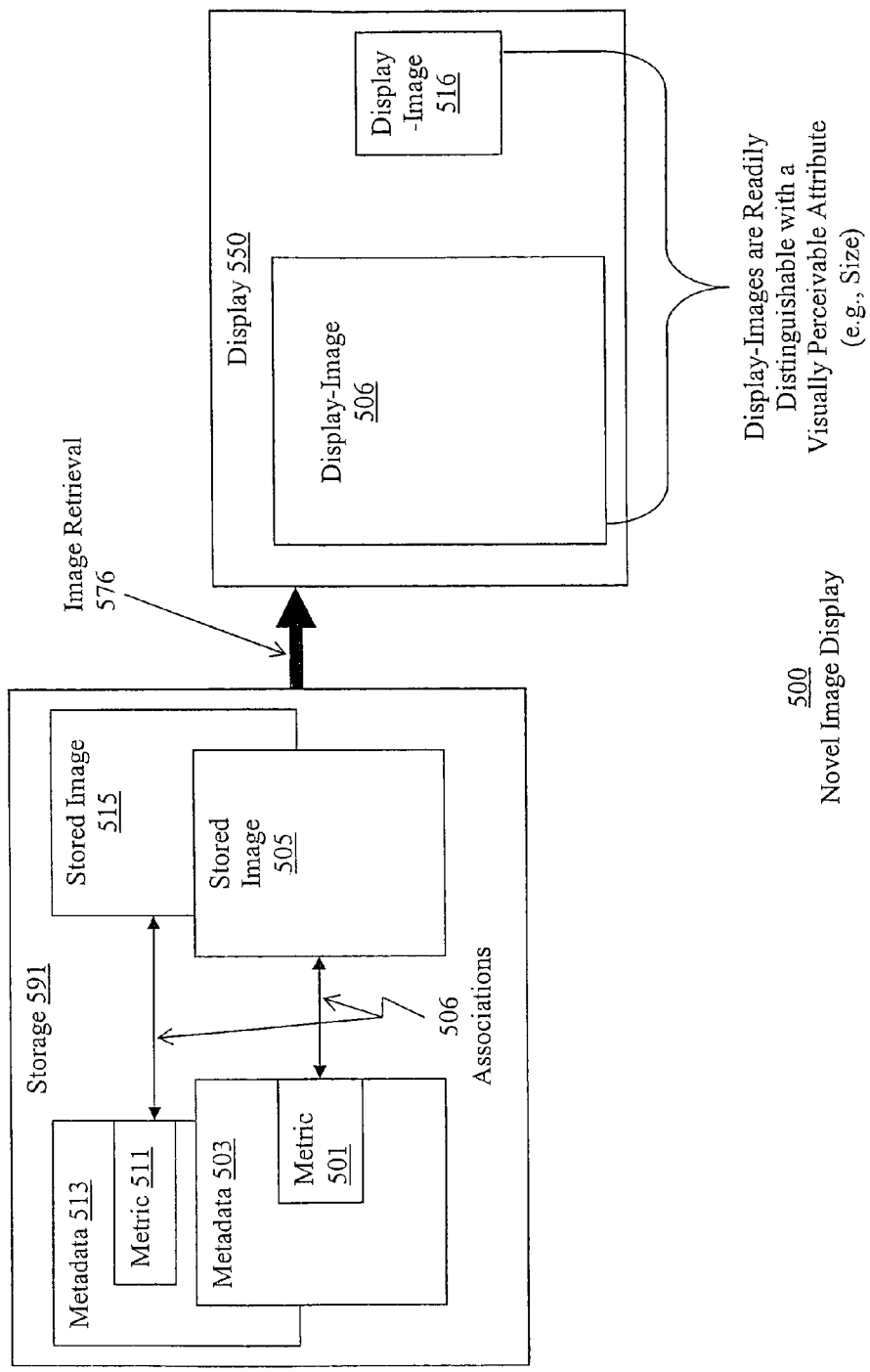
FIG. 5 depicts image display, according to an embodiment of the present invention.

FIG. 5 depicts image display 500, according to an embodiment of the present invention. Images 505 and 515 are stored electronically within storage unit 591, which can comprise memory, drives, servers, one or more SANs or any other medium, apparatus or network capable of image storage. While only two images are shown for simplicity and brevity, as well as to avoid confusion, it will be understood by those skilled in the relevant arts that the number of images storable is limited only by the storage capacity of storage unit 591.

Stored with images 505 and 515 are metadata 503 and 513, which are respectively associated each therewith. These metadata respectively include metrics 501 and 511. Metric 501 is associated with image 505 and metric 511 is associated with image 515 according to the associations 506. Images 505 and 515 are retrieved (e.g., accessed in storage 591, processed, etc.) and transmitted via image retrieval path 576 for display with display 450. Image retrieval path 576 includes, in various embodiments, one or more buses, wire line and/or wireless transmission media. Display 550 comprises a computer monitor or other display vehicle and image processing means such as a graphics card.

The metrics 501 and 511, respectively relating to images 505 and 515, vary. Upon image retrieval via image path 576, display-images 506 and 516 are displayed by display 550 in such a way that they are readily distinguishable from each other, according to some visually perceivable attribute that is based upon each of the metrics 501 and 511. The metrics 501 and 511 respectively correspond to the stored-images 505 and 515, which are graphically represented with the display-images 506 and 516. In order to visually distinguish the display-images 506 and 516, a user viewing display 550 need only view the visually perceivable attribute that readily distinguishes them from one another, based on their respective metrics 501 and 511.

The visually perceivable attribute depicted in FIG. 5 comprises the relative displayed size (e.g., image border lengths, display area occupied, etc.) of display-images 506 and 516 on display 550. Display-image 506 is displayed "larger" than display-image 516. This indicates that metric 501, associated with the stored image 501 (represented graphically with display-image 506), has a higher value (e.g., significance level, etc.) than the metric 511, associated with image 515 (represented graphically with display-image 516). However, size is not the only visually perceivable attribute with which the relationship between metrics 501 and 511 may be visually displayed with display 550.

In addition to the relative display sizing of display-images 506 and 516, other visually perceivable attributes may reflect their respective metrics 501 and 511. Display-images 506 and 516 may be displayed on display 550 such that the respective metrics 501 and 511 of their underlying stored-images 505 and 515 are reflected with relative degrees of brightness, clarity, contrast, tone, coloration, fuzziness, trim or border enhancements, transparency, opacity, shape, text based comments, and the like. The visually perceivable attributes that can be displayed may be selected. One may comprise a default and others may be programmed.

Exemplary Computer System Platform

Figure 6:
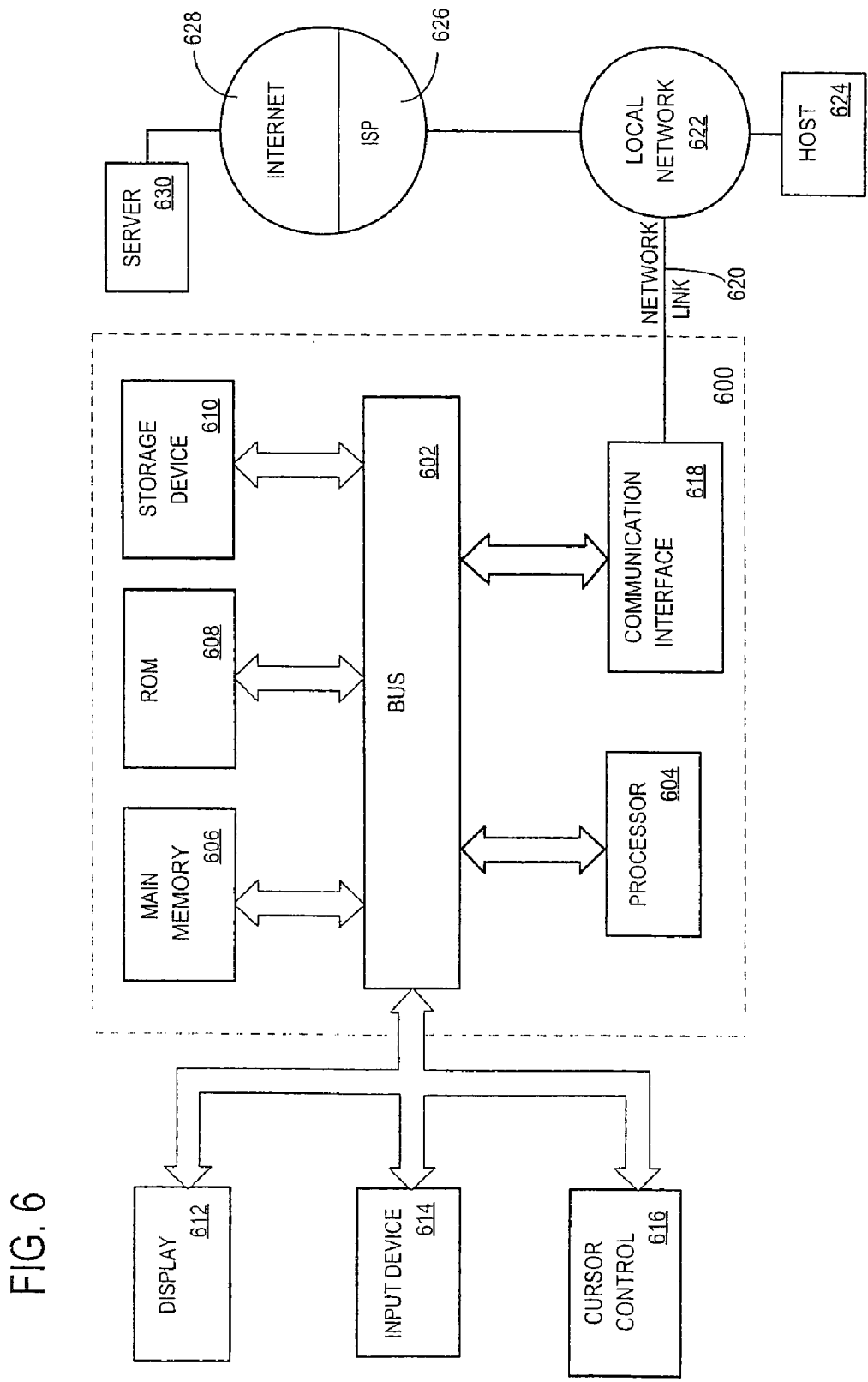
FIG. 6 depicts an exemplary computer system, upon which embodiments of the present invention may be implemented

FIG. 6 depicts an exemplary computer system 600, upon which embodiments of the present invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a Liquid Crystal Display (LCD) panel, a cathode ray tube (CRT) or the like, for displaying information to a computer user. In one embodiment, display 505 (FIG. 5) is implemented with display 612. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The exemplary embodiments of the invention are related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The phrases "computer readable medium" and "machine-readable medium" as used herein refer to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape and other legacy media and/or any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

Exemplary Digital Image Management System

Figure 7:
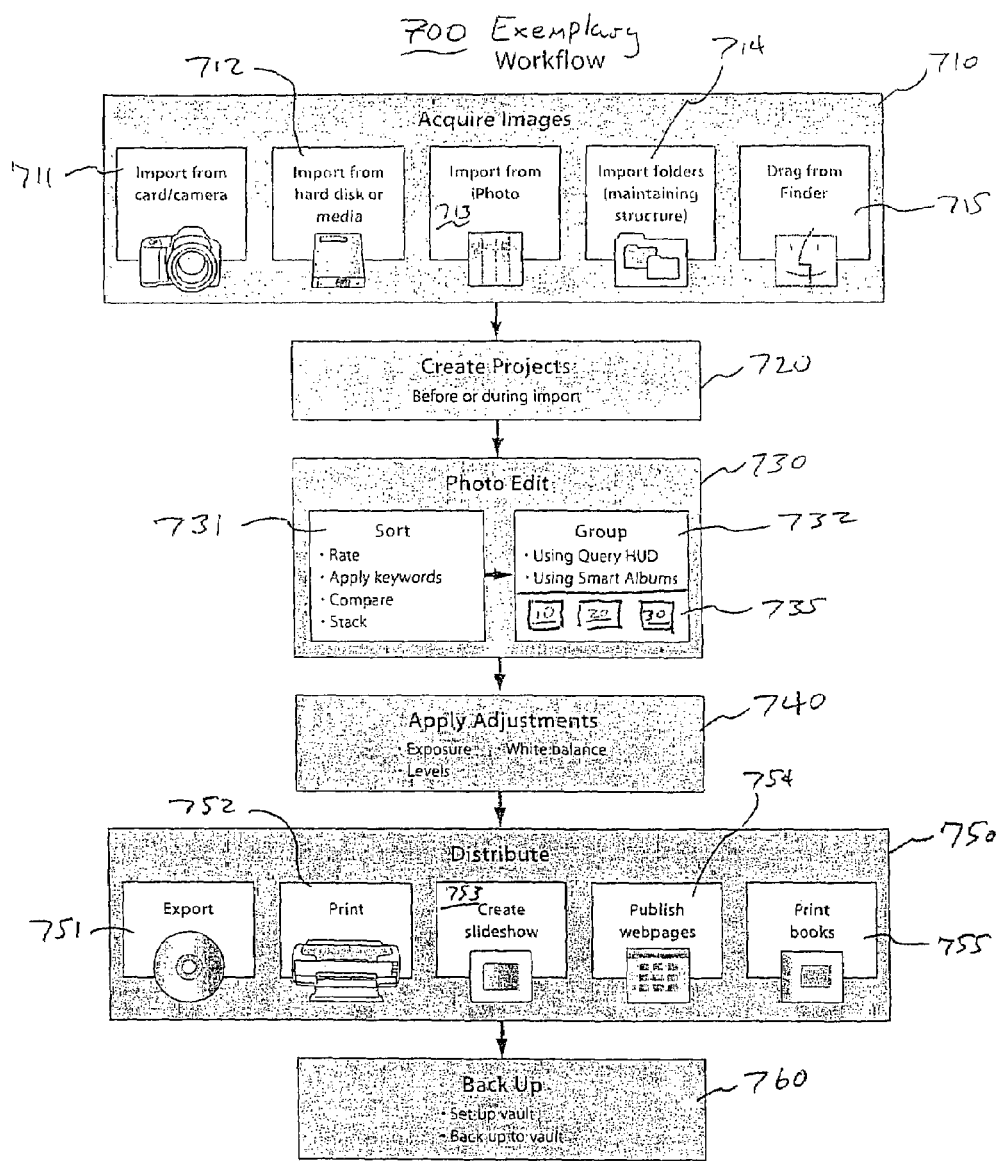
FIG. 7 depicts an exemplary digital image management system flow, with which embodiments of the present invention may be implemented.

FIG. 7 depicts an exemplary digital image management application flow 700, with which embodiments of the present invention may be implemented. Application 700 has an image acquisition functionality 710, a project creation functionality 720, a photographic editing functionality 730, an image adjustment functionality 740, an image distribution functionality 750 and an image backup functionality 760.

Image acquisition functionality 710 enables and employs a number of functions, which allow images to be acquired from any one or more of several sources. Import function 711 allows importation of images from a digital camera and/or from flash and other storage cards. Import function 712 allows importation of images from a hard disk drive or any of a variety of media. Import function 713 allows importation of images from another photographic application. Import function 714 allows importation of image containing data folders, as well as maintenance of the file structure that characterizes the imported folder. Import function 715 allows importation of images with a drag action, using a graphical user interface (GUI), another user interface or a similar modality.

Project creation functionality 720 allows users to establish image management projects. Users may apply these project creation functions before or during the operation of image acquisition functionality 710. In some embodiments, project creation functionality 720 comprises an operation of an editing functionality (e.g., photographic editing functionality 730).

Photographic editing functionality 730 enables and employs a sort function 731 and a grouping function 732, and may also enable, embody and/or use the operation of a project creation functionality (e.g., project creation functionality 720). The sort function 731 allows a user to rate images, with which the user may conveniently add a metric with which embodiments of the present invention may determine, for displaying images with visually perceivable attributes. The sort function 731 allows keyword associations to be applied to images and allows images to be compared and stacked. Information associated with images with the sort function 731 can be used with the grouping function 732.

Grouping function 732 allows images to be grouped for storage, distribution and/or display using query and GUI functions and album creation functions, which can operate with programmed logic. In one embodiment, the grouping function 732 comprises an image display method module 735. The image display methods described herein (e.g., methods 10, 20 and 30; FIGS. 1, 2 and 3, respectively) are implemented, in one embodiment, with the operation of image display method module 735.

Image adjustment functionality 740 allows users to apply a variety of graphical adjustments to images. Such adjustments comprise changes, alterations, modifications, corrections and fine-tuning of exposure, levels, coloration, "white balance" and the like.

Users may apply these image adjustment functions before or during the operation of photographic editing functionality 730. In some embodiments, image adjustment functionality 740 comprises a function of an editing functionality (e.g., photographic editing functionality 730). Thus, image adjustments performed with image adjustment functionality 740 may comprise metadata tags and metrics used with the image display methods described herein (e.g., methods 10, 20 and 30; FIGS. 1, 2 and 3, respectively) for generating a visually perceivable attribute for displaying display-images to represent stored images.

Distribution functionality 750 enables and employs a number of functions, which allow images to be distributed to any one or more of several destinations, for storage, further processing, medium transcendence, proliferation, transmission and display. An export module 751 allows images to be copied to exportable media such as optically transcribed media, which include Compact Disks (CD), Digital Video/Versatile Disks (DVD) and similar media (e.g., BluRay™), "flash" and other drives, magnetically transcribed media (e.g., diskettes, "floppies," Zip™ drives, etc.) and other transportable media. Export module 751 also allows images to be transmitted via communication and networking ports (e.g., network link 620, communication interface 618; FIG. 6) using wire line and wireless media, communication networks and the like.

Printing module 752 allows digital photographs and other images to be printed and thus to effectively transcend their media format. Slideshow module 753 allows images to be electronically formatted for sequential display. Publication module 754 allows images to be encoded for publication as a webpage or similar format, e.g., in Hyper Text Markup Language (HTML) or the like. Publication module 755 allows images to be processed for incorporation with text and similar information for publication in printed formats and effectively facilitates desktop publishing. Back up functionality 760 allows creation of secure image backup storage media, e.g., vaults and allows images to be backed up therein. In some embodiments, the operations of backup functionality 760 can be performed with, as part of, or subsumed by those of distribution functionality 750.

The functions of exemplary digital image management application 700 may be provided by the operation of computer hardware such as described with reference to FIG. 6, along with firmware and software and in various combinations thereof. Embodiments of the present invention function, in one implementation, with a digital image management application 700 such as that provided with the Aperture™ Application, commercially available from Apple™ Computers, a corporation in Cupertino, Calif. However, those skilled in the relevant arts will realize that any of a number of image management applications may be used with embodiments of the present invention and that some embodiments may be practiced apart from such an image management application.

Exemplary Graphical User Interface

FIGS. 8A-8F depict exemplary use of an exemplary graphical user interface (GUI) 800, according to an embodiment of the present invention. GUI 800 functions with a display 801, upon which display images 811 and 812 are shown. Display 801 also displays an interactive metric weight selector 823. While shown in pictures 8A-8D with a "sliding bar" type configuration, it should be apparent that interactive metric weight selector 823 can take on any functional configuration, which in one embodiment is selectable by a user or administrator. In one embodiment, selector 823 also allows selection of a visually perceivable attribute reflective yet logically independent of the metric. In another embodiment, another interactive selector performs this function, apart from and/or independent of interactive metric weight selector 823.

While shown on display 801 with display images 811 and 812, the metric weight selector 823 need not always be so shown. In various implementations, the metric weight selector 823 may be so shown or it may be hidden until summoned onto display 801 with a user action taken with a pop-up, drop-down, or similar menu accessed with an interfacing device such as a mouse.

Metric weight selector 823 is shown with three weight selections, 'Hi' for high metric weight, 'Med' for medium metric weight and 'Lo' for low metric weight. While shown in pictures 8A-8D with three weight selections, it should be apparent that interactive metric weight selector 823 can allow any functional number of user-selectable weight gradations, which in one embodiment is selectable by a user or administrator.

A user operates GUI 800 with on-screen manipulations of a cursor 825 over metric weight selector 823. In one exemplary implementation, the user manipulates the mouse (or other interfacing device) to move the cursor 825 along the displayed interactable contours of metric weight selector 823 to designate a portion of the metric weight selector 823 corresponding to the metric weight selection desired. The metric weight is then selected with a click of the mouse trigger with the cursor on that portion or some similarly effective action.

A higher metric weight selection will cause display images to be shown with more pronounced visually discernable attributes reflective of the weighting differences of the underlying images they show. Conversely, a lower metric weight selection will cause display images to be shown with less pronounced visually discernable attributes reflective of the weighting differences of the underlying images they show.

While shown in pictures 8A-8D as a somewhat bold vertical arrow pointer, it should be apparent that cursor 825 can take virtually any functionally recognizable aspect, which in one embodiment is selectable by a user or administrator. In some implementations, cursor 825 can have other functions as the user moves it to other areas of display 801 apart from metric weight selector 823 and in fact, can change its appearance, aspect, form factor, etc. as it is moved to or away therefrom. This can be useful for highlighting for users the purpose of cursor 825 in relation to metric weight selector 823 and in fact, for its uses elsewhere in display 801.

A variety of visually discernable attributes may be used to reflect the relative metric weight selections, including but not limited to relative display image size and/or transparency. In one implementation, the attribute is user-selectable from the available variety. In one implementation, one visibly discernable attribute comprises a 'default' with which metrics are reflected in display images, absent a user selection of another visually discernable attribute.

Figure 8A:
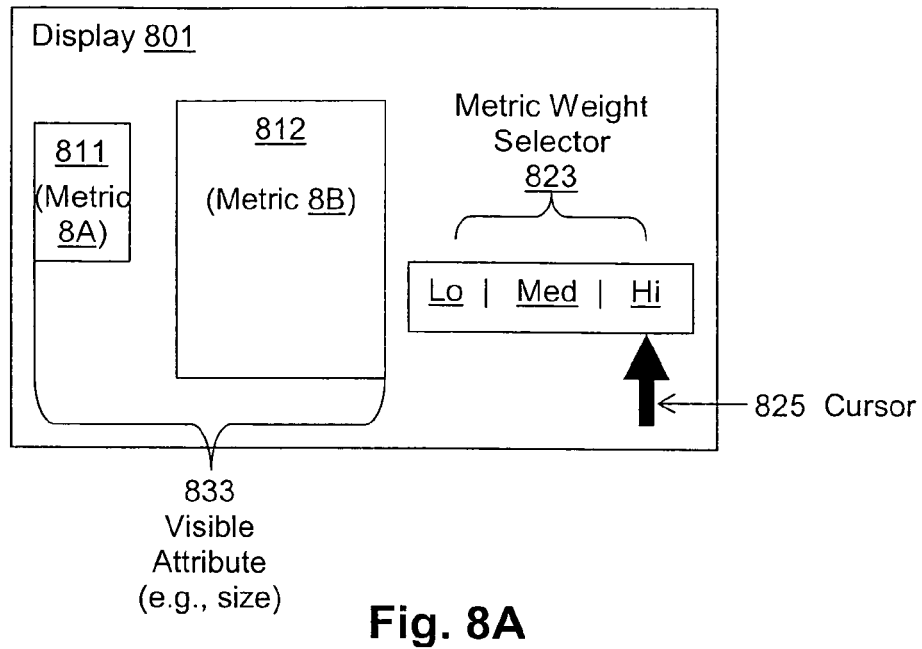
FIGS. 8A-8F depict exemplary use of a graphical user interface (GUI), according to an embodiment of the present invention.
Figure 8B:
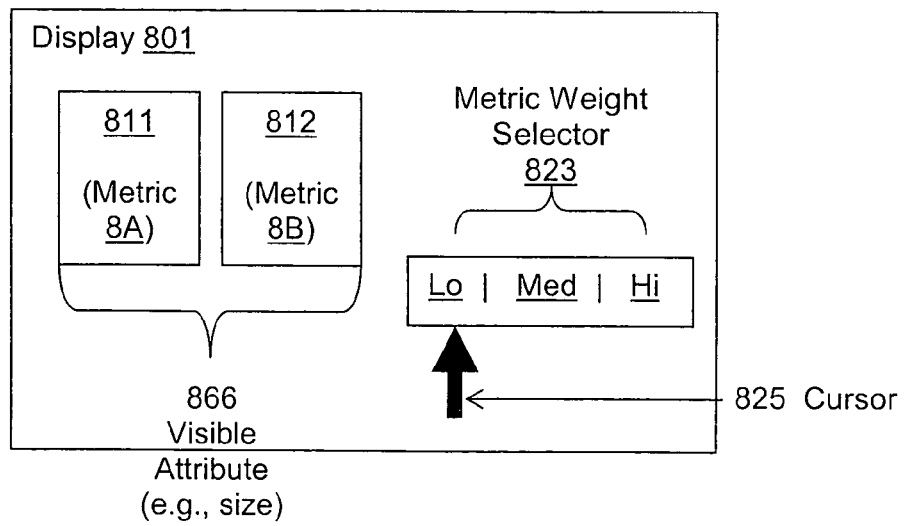

FIGS. 8A-8B depict the metric 8A, associated with display image 811, and the metric 8B, associated with display image 812, as reflected with "relative size" as the visibly discernable attribute. In contrast, FIGS. 8C and 8D, depict the metric 8A, associated with display image 811, and the metric 8B, associated with display image 812, as reflected with "relative transparency" as the visibly discernable (e.g., "visible") attribute.

In FIG. 8A, curser 825 is set at 'Hi' to set a high relative weight assignment for metrics 8A and 8B. The 'Hi' setting will pronounce the visible attribute 833 to be relatively more pronounced than in the lower 'Med' and/or 'Lo' settings. The 'size' visible attribute 833 makes it readily apparent to a viewer of display 801 that display image 812 is shown "larger" than display image 811 and thus indicates that metric 8B associated with display image 812 has a higher value than the metric 8A that is associated with display image 811.

In FIG. 8B, curser 825 is set at 'Lo' to set a low relative weight assignment for metrics 8A and 8B. The 'Lo' setting will pronounce the visible attribute 866 to be relatively less pronounced than in the lower 'Med' and/or 'Hi' settings. With the metric weight selector 823 set for 'Lo', the 'size' visible attribute 866 thus makes it somewhat less readily apparent to a viewer of display 801 with display images 812 and 811 that the respective metrics of their underlying images have differing values; e.g., display images 811 and 812 are shown with similar display sizes.

Figure 8C:
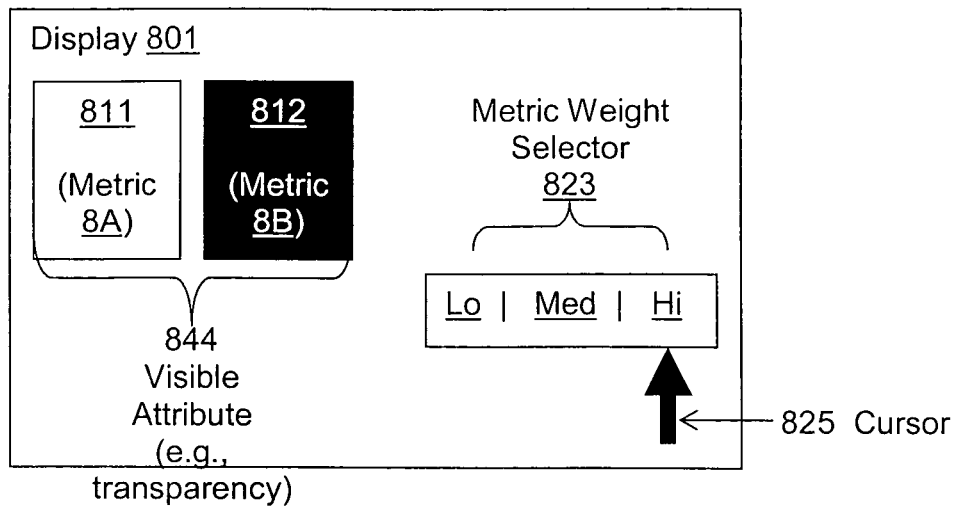
Figure 8D:
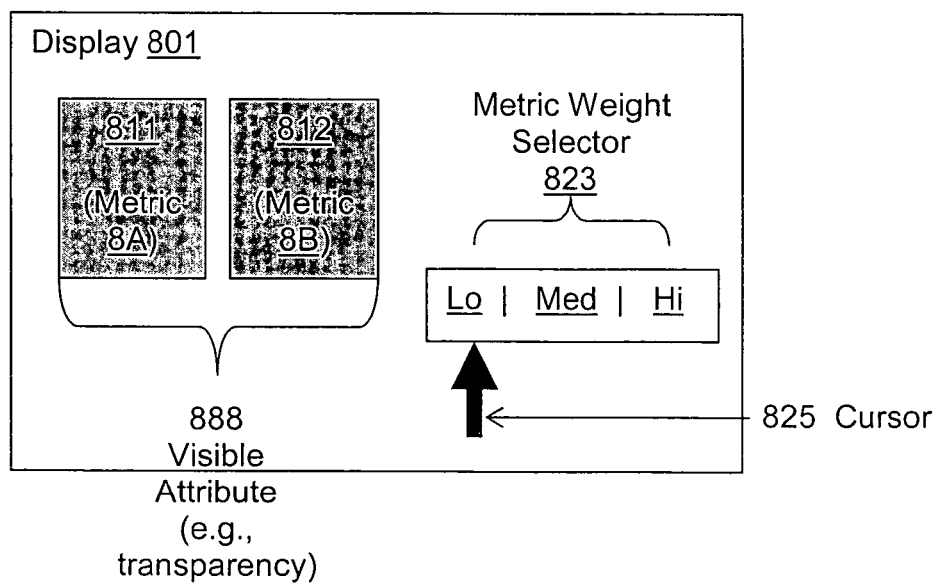

FIGS. 8C-8D depict the metric 8A, associated with display image 811, and the metric 8B, associated with display image 812, as reflected with "relative transparency" as the visible attribute. In FIG. 8C, curser 825 is set at 'Hi' to set a high relative weight assignment for metrics 8A and 8B. The 'Hi' setting will pronounce the visible attribute 833 to be relatively more pronounced than in the lower 'Med' and/or 'Lo' settings. The 'transparency' visible attribute 844 makes it readily apparent to a viewer of display 801 that display image 811 is shown "more transparent" than display image 812 (depicted as essentially opaque) and thus indicates that metric 8A associated with display image 811 has a higher value than the metric 8B that is associated with display image 812.

In FIG. 8D, curser 825 is set at 'Lo' to set a low relative weight assignment for metrics 8A and 8B. The 'Lo' setting will pronounce the visible attribute 888 to be relatively less pronounced than in the lower 'Med' and/or 'Hi' settings; display images 811 and 812 are shown with similar degrees of display transparency. With the metric weight selector 823 set for 'Lo', the 'size' visible attribute 888 thus makes it somewhat less readily apparent to a viewer of display 801 with display images 811 and 812 that the respective metrics of their underlying images have differing values.

Figure 8E:
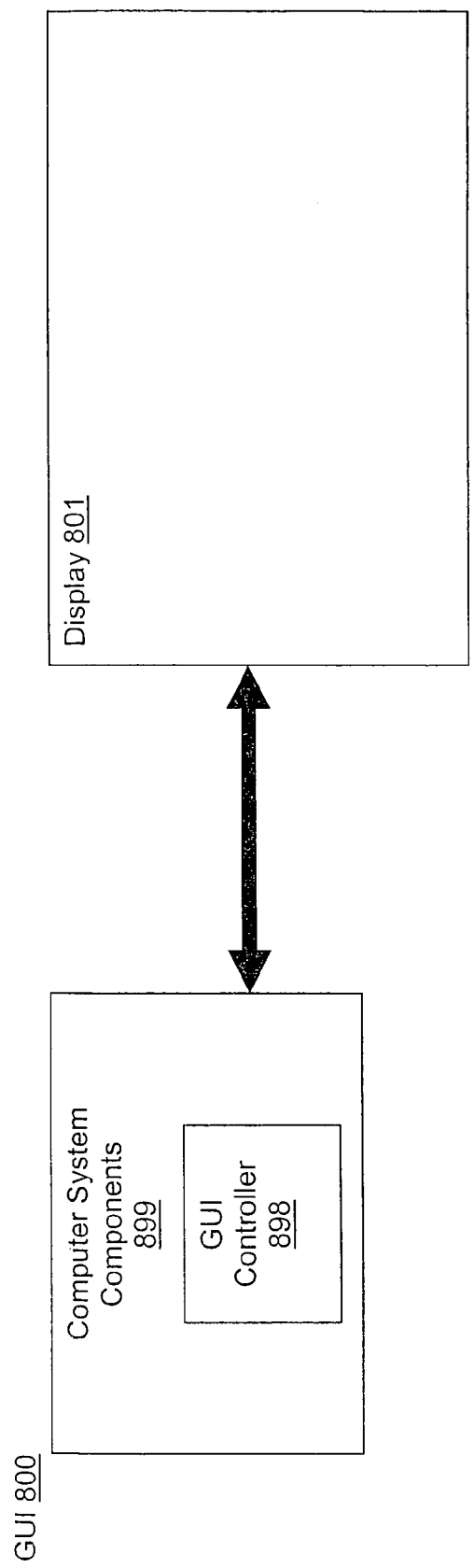

FIG. 8E depicts GUI 800, according to one embodiment of the present invention. GUI 800 has a GUI controller module 898, disposed with computer components 899 (which may comprise hardware, software, firmware, peripherals and various combinations thereof) and coupled to take input from and send signals to display 801 and components displayed thereon in FIGS. 8A-8D. In one embodiment, computer system components 899 are implemented or otherwise associated with computer system 600 (FIG. 6).

GUI controller module 898 receives movement, selection, trigger and related information from cursor 825, e.g., with respect to metric weight selector 823. Based on user inputs and related display field values achieved with cursor 825 and metric weight selector 823, GUI controller 898 functions with one or more of the computer system components 899 function to display images such as display images 811 and 812 on display 801 in such a way that the visible attributes of the display images reflect metrics associated with their underlying stored images.

Figure 8F:
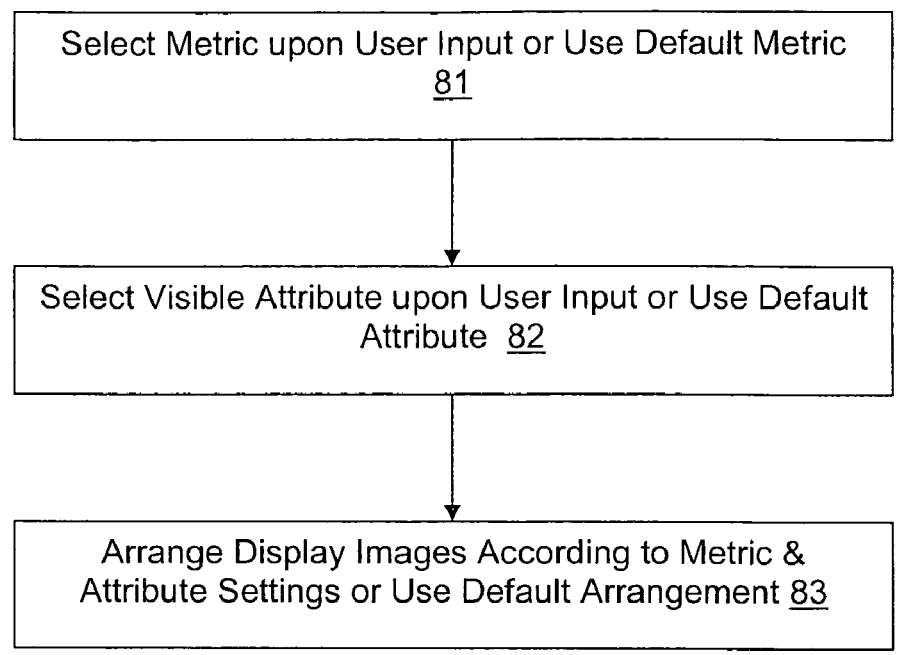

FIG. 8F depicts a flowchart of a computer-implemented process 80 for displaying an image using the GUI 800, according to one embodiment of the present invention. Process 80 begins with step 81, wherein a metric associated with an image to be displayed is selected based on a user input (or a default metric is used).

In step 82, a visually discernable (e.g., "visible") attribute, reflective of the metric, is selected based on a user input (or a default attribute is used). In step 83, the display images are arranged on a display according to the selected metric and attribute settings (or using a default arrangement), wherein process 80 may be complete.

Exemplary Display System

Figure 9:
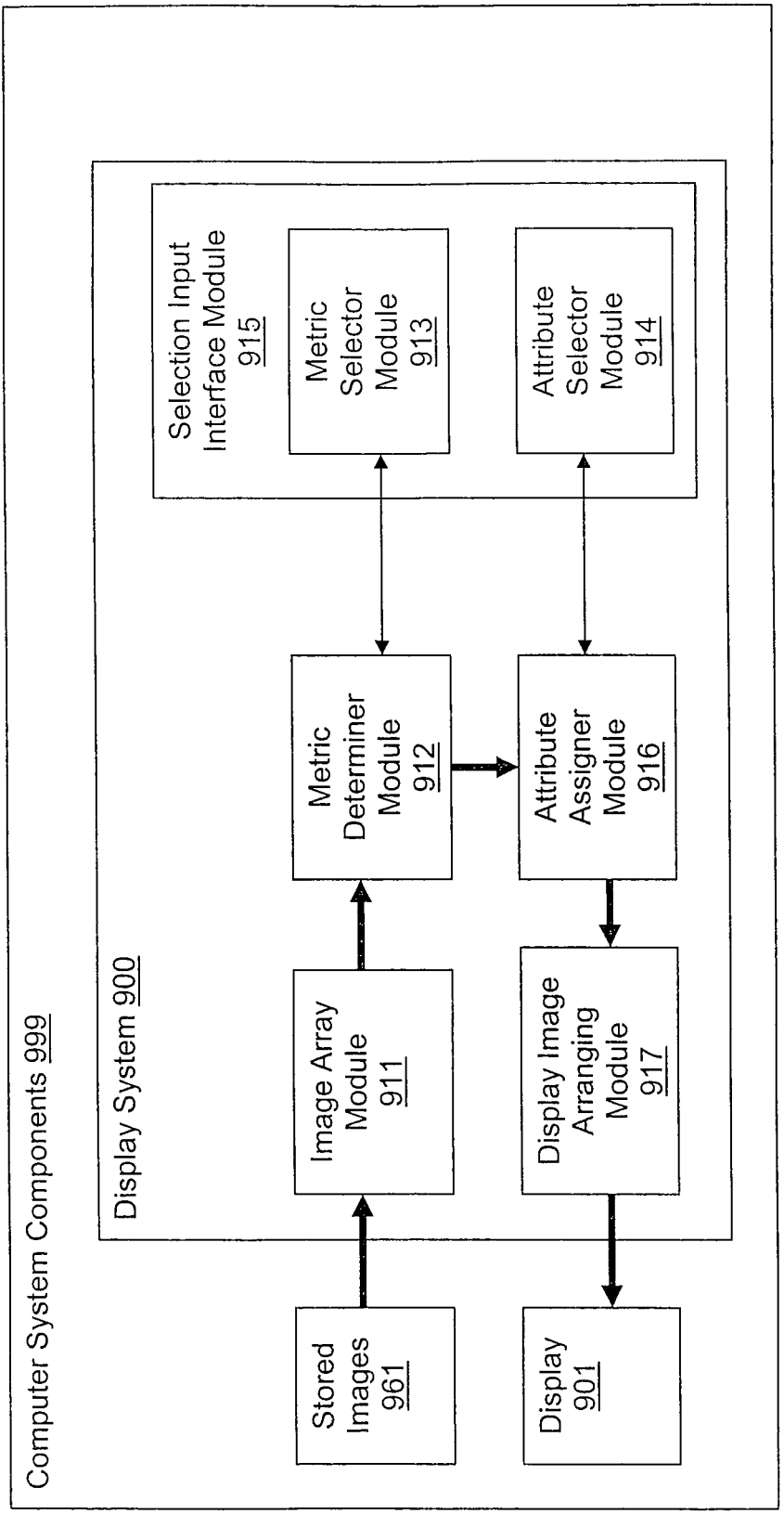
FIG. 9 depicts an exemplary modular display system, according to an embodiment of the present invention.

FIG. 9 depicts an exemplary modular display system 900, according to an embodiment of the present invention. Display system 900 comprises, in various embodiments, software, machine readable code and the like, hardware, firmware and/or combinations thereof. Software implementations of display system 900 are, in one embodiment, encoded in any of a variety of tangible computer readable storage media.

In one embodiment, display system 900 is disposed with computer system components 999 (which may comprise hardware, software, firmware, peripherals and various combinations thereof) and coupled to access stored images 961 and to take input from and send controlling and other signals to display 901 and components displayed thereon in FIGS. 8A-8D. In one embodiment, computer system components 999 are implemented or otherwise associated with computer system 600 (FIG. 6).

Stored images 961, with their associated metadata including metrics, are accessed by display system 900 with image array module 911. Image array module 911 functions to prepare multiple display images associated with stored images 961 for display as an array. Image array module 911 is coupled to metric determiner module 912.

For each of the multiple stored images 961, metric determiner module 912 determines from their associated metadata at least one metric associated therewith. The metric corresponds to a significance rating that is associated with each of the multiple images. Metric determiner module 912 is coupled to attribute assigner module 916.

Attribute assigner module 916 assigns a visually discernable (e.g., "visually perceivable," "visible," etc.) attribute to each display image to be displayed based on one of the multiple underlying stored images 961. The visible attribute reflects the metric, yet is logically independent therefrom. Attribute assigner module 916 is coupled to display image arranging module 917.

Display image arranging module 917 controls display 901 to display thereon display images corresponding to stored images 961. The display images are arranged so that each of the multiple electronically stored images 961 is displayed in a view in which each image is shown with at least one visually perceivable attribute that is logically independent of the metric and yet reflective thereof. This allows the display images to be distinguishable from each other in the view based on the visually perceivable attribute.

In one embodiment, display system 900 has a selection input interface module 915, which can function with a GUI (e.g., GUI 800; FIG. 8A-8E) or other user interface to control selection of metrics and/or visible attributes. Selection interface module 915 has a metric selector module 913 and a visible attribute selector module 914. Metric selector module 913 controls metric determiner module 912 to select metrics, assign significance thereto, etc. Visible attribute selector module 914 controls attribute assigner module 916 to select visible attributes and in one embodiment, to input selected metric weights (e.g., from metric weight selector 823; FIG. 8A-8D).

Summary, Equivalents & Miscellaneous

Thus, a method for displaying an image is described. One method comprises determining, for each of multiple images, at least one metric associated with the image. The multiple images are displayed in a view in which each of the multiple images is associated with at least one visually perceivable attribute that reflects at least the determined metric. The attributes that reflect the metrics are logically independent of the metrics. In one embodiment, the metric relates to a significance value associated with the image. In one embodiment, the visually perceivable attribute relates to a size with which the multiple images are displayed in relation to each other.

In the foregoing specification, exemplary embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction and including their equivalents. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for displaying images, comprising:
receiving user input that selects a user-selected visually perceivable attribute from a plurality of selectable visually perceivable attributes;
displaying a plurality of images in a manner that visually reflects values that the images have for a particular metric;
wherein displaying the plurality of images includes, for each image of a plurality of images:
determining a default value of the user-selected visually perceivable attribute; and
displaying the image so that the displayed user-selected visually perceivable attribute of the image is changed from the default value, and the amount of change from the default value is based on the value that the image has for the particular metric;
wherein the particular metric is logically independent of the user-selected visually perceivable attribute; and
wherein the method is performed by one or more computing devices.

2. The method as recited in claim 1, wherein said user-selected visually perceivable attribute is display size.

3. The method as recited in claim 1, wherein said user-selected visually perceivable attribute is brightness.

4. The method as recited in claim 1, wherein said user-selected visually perceivable attribute is at least one of clarity, contrast, tone, coloration, fuzziness, trim enhancements, border enhancements, transparency, opacity, and shape.

5. A method for displaying images, comprising:
receiving user input that selects a user-selected metric from a plurality of selectable metrics;

displaying a plurality of images in a manner that visually reflects values that the images have for the user-selected metric;

wherein displaying the plurality of images includes, for each image of a plurality of images:
  determining a default value of a visually perceivable attribute of the image; and
  displaying the image so that the displayed visually perceivable attribute of the image is changed from the default value, and the amount of change from the default value is based on the value of the user-selected metric for the image;

wherein the visually perceivable attribute is logically independent of the user-selected metric; and wherein the method is performed by one or more computing devices.

6. The method as recited in claim 5, wherein said user-selected metric comprises significance ratings associated with the image.

7. The method as recited in claim 5, wherein said user-selected metric comprises metadata stored in relation to the image.

8. The method as recited in claim 6, wherein displaying the plurality of images includes displaying images that have relatively higher significance ratings in relatively larger display sizes.

9. The method as recited in claim 5, wherein said user-selected metric comprises metadata stored in relation to the image.

10. The method as recited in claim 9, wherein said user-selected metric comprises at least one of:
  an objective rating of the image, wherein said objective rating comprises a user-assigned value corresponding to an inherent characteristic associated with the image; and
  a subjective rating of the image wherein said subjective rating comprises a user-assigned value corresponding to one or more of an aesthetic merit and a personal preference associated by said user with the image.

11. The method as recited in claim 5, wherein said user-selected metric comprises at least one of:
  Exchangeable Image File (EXIF) data associated with the image; and
  International Press Telecommunications Council ((IPTC) data associated with the image.

12. The method as recited in claim 5, wherein said user-selected metric comprises at least one camera setting with which the image was captured.

13. The method as recited in claim 12, wherein said at least one camera setting comprises at least one of:
  a shutter speed;
  an aperture opening;
  a focal length;
  an exposure;
  information relating to a flash used in exposing the image; and
  a metering pattern.

14. The method as recited in claim 5, wherein said user-selected metric comprises at least one embedded data associated with the image.

15. The method as recited in claim 14, wherein said at least one embedded data comprises at least one of:
  a caption;
  a place at which the image was captured;
  at least one of a transparency, an opacity, a contrast, a brightness, a clarity, a fuzziness and a frame size with which the image was recorded;
  a photographic identity; and
  copyright information associated with the image.

16. A method for displaying images, comprising:
  receiving user input that selects a user-selected metric from a plurality of selectable metrics;
  receiving user input that selects a user-selected magnitude of effect for the user-selected metric;
  determining a default value of a visually perceivable attribute of an image;
  displaying the image so that the displayed visually perceivable attribute of the image is changed from the default value, and the amount of change from the default value is based on the value of the user-selected metric for the image and the user-selected magnitude of effect for the user-selected metric,
  wherein the visually perceivable attribute is logically independent of the user-selected metric, and
  wherein the method is performed by one or more computing devices.

17. The method as recited in claim 16, wherein the steps of obtaining a user-selected magnitude of effect and displaying the image are performed by a graphical user interface.

18. The method as recited in claim 16, wherein the graphical user interface includes an adjustable particular metric weight selector.

19. A method for displaying images, comprising:
  receiving user input that selects a first visually perceivable attribute from a plurality of visually perceivable attributes;
  receiving user input that selects a second visually perceivable attribute from the plurality of visually perceivable attributes, wherein the second visually perceivable attribute is different from the first visually perceivable attribute;
  determining a first default value of the first visually perceivable attribute of an image;
  determining a second default value of the second visually perceivable attribute of the image;
  displaying the image so that:
    the first displayed visually perceivable attribute of the image is changed from the first default value, and the amount of change from the first default value is based on a value of a first metric for the image, and
    the second displayed visually perceivable attribute of the image is changed from the second default value, and the amount of change from the second default value is based on a value of a second metric for the image,
  wherein each of the first visually perceivable attribute and the second visually perceivable attribute is logically independent of each of the first metric and the second metric, wherein the first visually perceivable attribute is different from the second visually perceivable attribute, and wherein the first metric is different from the second metric,
  wherein the method is performed by one or more computing devices.

20. The method as recited in claim 19, wherein at least one of the first and second metrics comprises significance ratings associated with the image.

21. The method as recited in claim 19, wherein at least one of the first and second metrics comprises metadata stored in relation to the image.

22. The method as recited in claim 19, wherein at least one of the first and second metrics comprises at least one of:
  an objective rating of the image, wherein said objective rating comprises a user-assigned value corresponding to an inherent characteristic associated with the image; and
  a subjective rating of the image, wherein said subjective rating comprises a user-assigned value corresponding to one or more of an aesthetic merit and a personal preference associated by said user with the image.

23. The method as recited in claim 19, wherein at least one of the first and second metrics comprises at least one camera setting with which the image was captured.

24. The method as recited in claim 23, wherein said at least one camera setting comprises at least one of:
- a shutter speed;
- an aperture opening;
- a focal length;
- an exposure;
- information relating to a flash used in exposing the image; and
- a metering pattern.

25. The method as recited in claim 19, wherein at least one of the first and second metrics comprises at least one embedded data associated with the image.

26. The method as recited in claim 23, wherein said at least one embedded data comprises at least one of:
- a caption;
- a place at which the image was captured;
- at least one of a transparency, an opacity, a contrast, a brightness, a clarity, a fuzziness and a frame size with which the image was recorded;
- a photographic identity; and
- copyright information associated with the image.

27. A non-transitory computer-readable storage medium carrying one or more sequences of instructions which, when executed by one or more processors, causes the one or more processors to perform the method recited in claim 1.

28. A non-transitory computer-readable storage medium carrying one or more sequences of instructions which, when executed by one or more processors, causes the one or more processors to perform the method recited in claim 2.

29. A non-transitory computer-readable storage medium carrying one or more sequences of instructions which, when executed by one or more processors, causes the one or more processors to perform the method recited in claim 3.

30. A non-transitory computer-readable storage medium carrying one or more sequences of instructions which, when executed by one or more processors, causes the one or more processors to perform the method recited in claim 4.

31. A non-transitory computer-readable storage medium carrying one or more sequences of instructions which, when executed by one or more processors, causes the one or more processors to perform the method recited in claim 5.

32. A non-transitory computer-readable storage medium carrying one or more sequences of instructions which, when executed by one or more processors, causes the one or more processors to perform the method recited in claim 6.

33. A non-transitory computer-readable storage medium carrying one or more sequences of instructions which, when executed by one or more processors, causes the one or more processors to perform the method recited in claim 7.

34. A non-transitory computer-readable storage medium carrying one or more sequences of instructions which, when executed by one or more processors, causes the one or more processors to perform the method recited in claim 8.

35. A non-transitory computer-readable storage medium carrying one or more sequences of instructions which, when executed by one or more processors, causes the one or more processors to perform the method recited in claim 9.

36. A non-transitory computer-readable storage medium carrying one or more sequences of instructions which, when executed by one or more processors, causes the one or more processors to perform the method recited in claim 10.

37. A non-transitory computer-readable storage medium carrying one or more sequences of instructions which, when executed by one or more processors, causes the one or more processors to perform the method recited in claim 11.

38. A non-transitory computer-readable storage medium carrying one or more sequences of instructions which, when executed by one or more processors, causes the one or more processors to perform the method recited in claim 12.

39. A non-transitory computer-readable storage medium carrying one or more sequences of instructions which, when executed by one or more processors, causes the one or more processors to perform the method recited in claim 13.

40. A non-transitory computer-readable storage medium carrying one or more sequences of instructions which, when executed by one or more processors, causes the one or more processors to perform the method recited in claim 14.

41. A non-transitory computer-readable storage medium carrying one or more sequences of instructions which, when executed by one or more processors, causes the one or more processors to perform the method recited in claim 15.

42. A non-transitory computer-readable storage medium carrying one or more sequences of instructions which, when executed by one or more processors, causes the one or more processors to perform the method recited in claim 16.

43. A non-transitory computer-readable storage medium carrying one or more sequences of instructions which, when executed by one or more processors, causes the one or more processors to perform the method recited in claim 17.

44. A non-transitory computer-readable storage medium carrying one or more sequences of instructions which, when executed by one or more processors, causes the one or more processors to perform the method recited in claim 18.

45. A non-transitory computer-readable storage medium carrying one or more sequences of instructions which, when executed by one or more processors, causes the one or more processors to perform the method recited in claim 19.

46. A non-transitory computer-readable storage medium carrying one or more sequences of instructions which, when executed by one or more processors, causes the one or more processors to perform the method recited in claim 20.

47. A non-transitory computer-readable storage medium carrying one or more sequences of instructions which, when executed by one or more processors, causes the one or more processors to perform the method recited in claim 21.

48. A non-transitory computer-readable storage medium carrying one or more sequences of instructions which, when executed by one or more processors, causes the one or more processors to perform the method recited in claim 22.

49. A non-transitory computer-readable storage medium carrying one or more sequences of instructions which, when executed by one or more processors, causes the one or more processors to perform the method recited in claim 23.

50. A non-transitory computer-readable storage medium carrying one or more sequences of instructions which, when executed by one or more processors, causes the one or more processors to perform the method recited in claim 24.

51. A non-transitory computer-readable storage medium carrying one or more sequences of instructions which, when executed by one or more processors, causes the one or more processors to perform the method recited in claim 25.

52. A non-transitory computer-readable storage medium carrying one or more sequences of instructions which, when executed by one or more processors, causes the one or more processors to perform the method recited in claim 26.

* * * * *